United States Patent [19]

Medina et al.

[11] Patent Number: 5,568,651
[45] Date of Patent: Oct. 22, 1996

[54] METHOD FOR DETECTION OF CONFIGURATION TYPES AND ADDRESSING MODES OF A DYNAMIC RAM

[75] Inventors: Eitan Medina, Jerusalem; Simoni Ben-Michael, Givat Zeev; Yifat Ben-Shahar, Jerusalem, all of Israel; Niamh Darcy, Acton, Mass.

[73] Assignee: Digital Equipment Corporation, Maynard, Mass.

[21] Appl. No.: 333,809

[22] Filed: Nov. 3, 1994

[51] Int. Cl.$^6$ .......................... G06F 13/00; H04L 12/28
[52] U.S. Cl. ...................... 395/894; 364/DIG. 1; 364/DIG. 2; 395/200.1; 395/432; 395/401
[58] Field of Search .................. 364/200 MS File, 364/900 MS File; 395/429, 401, 410, 497.01–.04, 200.1, 833, 894, 401, 432, 433

[56] References Cited

U.S. PATENT DOCUMENTS

| | | | |
|---|---|---|---|
| 4,739,473 | 4/1988 | Ng et al. | 395/550 |
| 5,040,153 | 8/1991 | Fung et al. | 365/230.03 |
| 5,274,768 | 12/1993 | Traw et al. | 395/275 |
| 5,287,531 | 2/1994 | Rogers, Jr. et al. | 395/800 |
| 5,317,709 | 5/1994 | Sugimoto | 395/425 |
| 5,408,129 | 4/1995 | Farmwald et al. | 257/692 |

OTHER PUBLICATIONS

Bursky, Dave, *Triple-Port Dynamic RAM Accelerates Data Movement*, Electronic Design, v38, n10, p3N(4), May 24, 1990.

*Primary Examiner*—Matthew M. Kim
*Attorney, Agent, or Firm*—Kenneth F. Kozik

[57] ABSTRACT

A method providing automating detection of configuration between an adapter device and a DRAM device. Such a method a determines, in the adapter memory, the DRAM configuration, making it easier to change DRAM configuration in an existing board without the need to modify configuration pins in the existing board. A method for determining a configuration type in an Asynchronous Transfer Mode (ATM) communications network comprising the steps of providing an ATM adapter, the ATM adapter having an ATM adapter memory, providing a DRAM device, the DRAM device having a DRAM configuration, providing a link to connect the ATM adapter and the DRAM device, assuming, in the ATM adapter memory, a first DRAM configuration, verifying the step of assuming, and repeating the steps of assuming and verifying until the first DRAM configuration is determined.

4 Claims, 4 Drawing Sheets

5,568,651

METHOD FOR DETECTION OF CONFIGURATION TYPES AND ADDRESSING MODES OF A DYNAMIC RAM

FIELD OF THE INVENTION

This invention relates generally to the field of computer networks, and more particularly to a method for the automatic detection of configuration types and addressing modes of a Dynamic Random Access Memory (DRAM) in an Asynchronous Transfer Mode (ATM) adapter.

BACKGROUND OF THE INVENTION

In general terms, a computer network is a collection of end systems (also known as nodes) interconnected through one or more communication links. Generally, the end systems both send data to other end systems on the network and receive data sent by other end systems on the network. When an end system is a sender of data, it is referred to as a source for that data; when it is a receiver of data, it is referred to as a destination for the data. Typically, end systems act as both sources and destinations depending on whether they are sending or receiving data. When acting as a source, the system typically sends data in the form of messages over a communication link. Messages can flow back and forth to other communication links and end systems within the network through bridges or routers, which are used to interconnect multiple communication links.

Each message comprises a sequence of bits. Typically, messages sent over a network are divided up into smaller blocks of information called packets. The flow of packets in the network is usually referred to as traffic. An important design objective in networks is controlling traffic so that individual packets will not be transmitted at a faster rate than they can be processed by the communication links, or intermediate systems such as bridges or routers, through which the packets will pass, or by the destinations.

Asynchronous Transfer Mode (ATM) is one of the general class of digital switching technologies that relay and route traffic by means of a virtual circuit identifier (VCI) contained within the cell. Unlike common packet technologies, such as X.25 or frame relay, ATM uses very short, fixed length units of information, called cells. In applications utilizing ATM, packets at a source are first broken up into these fixed length packets (ATM cells), transmitted, and then reassembled at a destination. ATM cells are 53 bytes long. They consist of a 5-byte header (containing an identifier of data flow which implicitly identifies the source address and the destination address) and a 48-byte information field. The header of an ATM cell contains all the information the network needs to relay the cell from one node to the next over a pre-established route. User data is contained in the remaining 48 bytes.

ATM uses a concept of virtual networking (or channels) to pass traffic between two locations, establishing virtual connections between a pair of ATM end-systems which are needed to connect a source with a destination. These connections are termed "virtual" to distinguish them from dedicated circuits. ATM cells always traverse the same path from source to destination. However, ATM does not have to reserve the path for one user exclusively. Any time a given user is not occupying a link, another user is free to use it.

ATM connections exist only as sets of routing tables held in each network node, switch, or other intermediate system, based on the virtual circuit identifier (VCI) and virtual path identifier (VPI) contained in the cell header. When a virtual path is established, each node (or switch) is provided with a set of lookup tables that identify an incoming cell by header address, route it through the node to the proper output port, and overwrite the incoming VCI/VPI with a new one that the next node along the route will recognize as an entry in its routing table.

The cell is thus passed from switch to switch over a prescribed route, but the route is "virtual" since the facility carrying the cell is dedicated to it only while the cell traverses it. Two cells that are ultimately headed for different destinations may be carried, one after the other, over the same physical wire for a common portion of their journey.

With current implementations of ATM, ATM adapters contain a DRAM interface with several possible configurations that differ in memory size as well as in DRAM device types. Each DRAM device type may have different addressing modes. With such an arrangement, extra input pins are added to a chip and a board layout designer decides what DRAM configuration to implement, and "hard-wires" them to the appropriate value.

A method of automatically detecting the current DRAM configuration is needed to reduce the cost of the chip and board, to reduce risk in the board layout, and to provide easy upgrade of the DRAM configuration in the board.

SUMMARY OF THE INVENTION

In accordance with the present invention, a method for determining a configuration type of a plurality of dynamic random access memory (DRAM) devices comprising the steps of providing an adapter, the adapter having an adapter memory, providing a first DRAM device, the first DRAM device having a DRAM configuration, providing an interface for communicating between the first DRAM device and the adapter, and determining, in the adapter memory, the DRAM configuration. One object of such an arrangement to make it easier to change DRAM configuration in an existing board without the need to modify configuration pins in the existing board.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
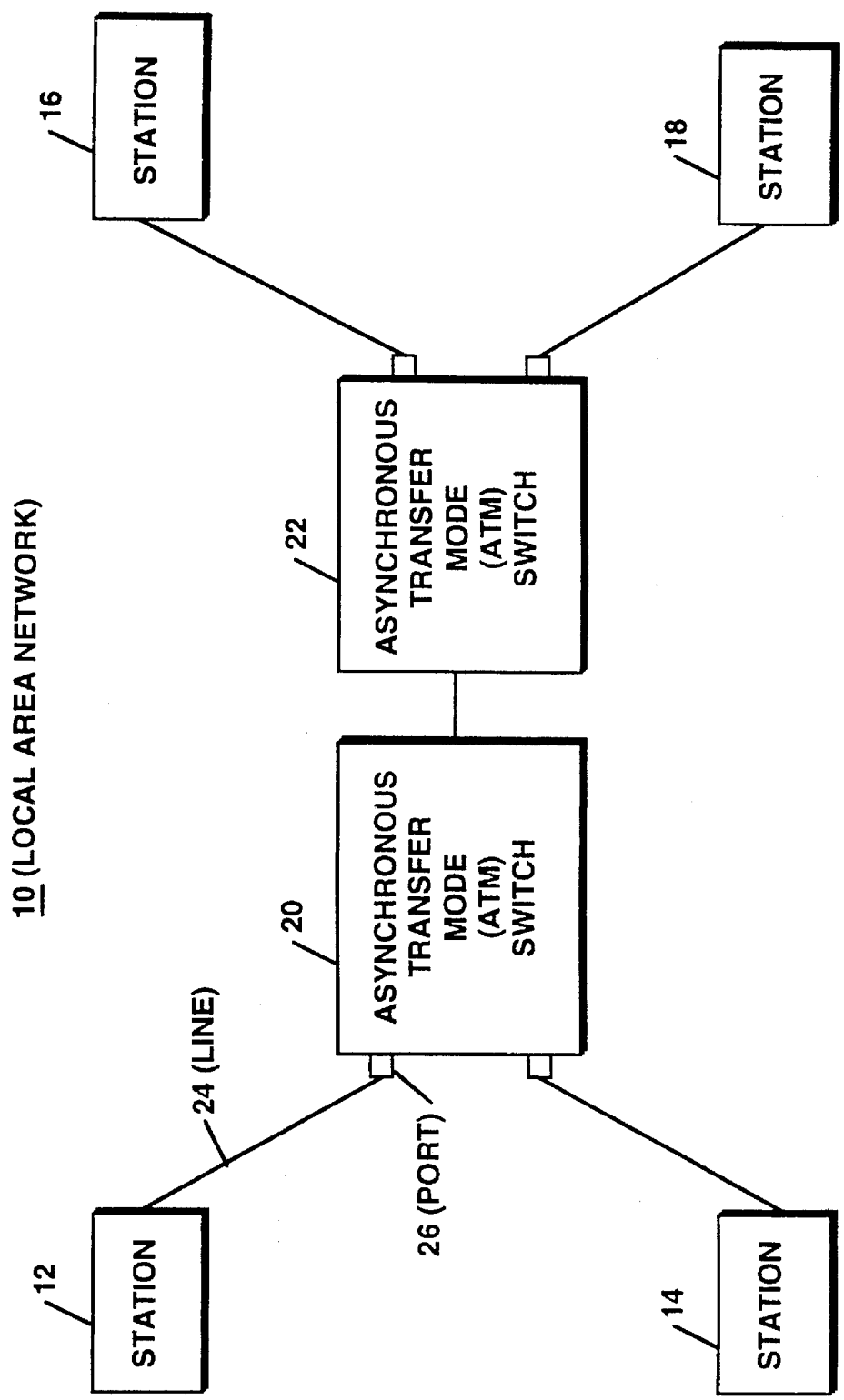
FIG. 1 is a block diagram showing an exemplary Asynchronous Transfer Mode (ATM) local area network (LAN)

Referring to FIG. 1, an exemplary Asynchronous Transfer Mode (ATM) local area network (LAN) 10 is shown to include four stations labeled as 12, 14, 16, and 18, respectively. The ATM network 10 is also shown to include two ATM switches labeled as 20 and 22, respectively. An ATM adapter resides in each of the stations 12, 14, 16, and 18. By way of example, if station 12 is transmitting packets for station 16, the ATM adapter in station 12 is involved in segmenting the packets into cells, and affixing the appropriate fields in a cell header (not shown). The ATM adapter in station 16 is involved in reassembling the cells received into a complete packet and delivering the packet to station 16. Control of the ATM network 10 resides in the ATM switches 20 and 22, which route messages between stations. For example, the station 12 may send a cell over a line 24 to ATM switch 20 through port 26. ATM switch 20 will route the cell to a destination, Station 16, for example, according to a VCI/VPI in an ATM cell header.

Because each port 26 is dedicated to one station 12, other stations (14 for example) do not have to contend for access to the ATM switch 20. Thus, the station 12 has full access to the line 24 regardless of the activity of other stations with other such connections. For example, if a 5 Mb file is being transmitted from station 12 to station 16, it can move to the ATM switch 20 in a continuous burst at the full channel rate, instead of sharing the communication link with the other stations and having intervening frames from other stations as with other LANs, such as Ethernet, Token Ring, and Fiber Distributed Data Interface (FDDI) LANs.

Figure 2:
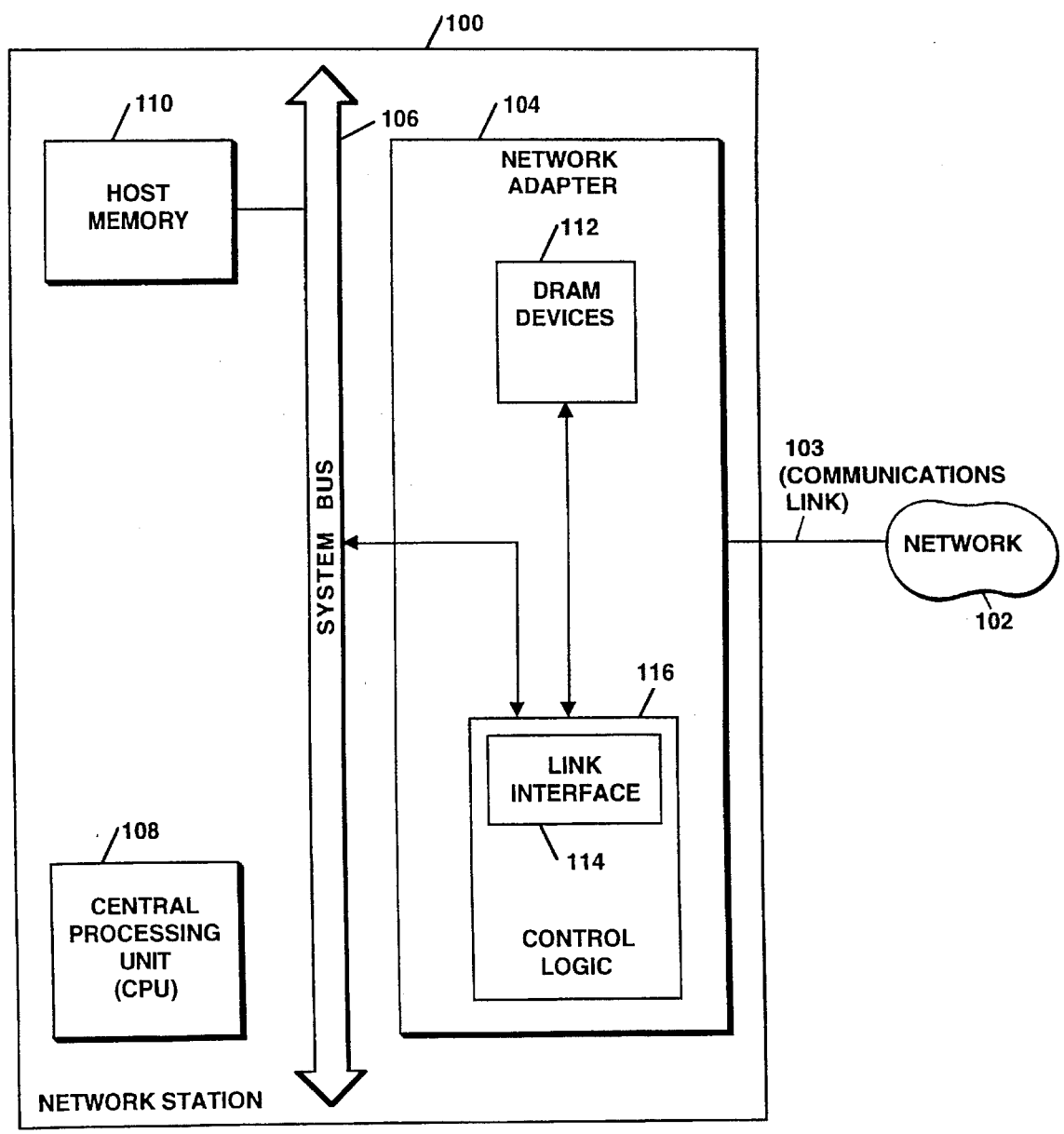
FIG. 2 is a block diagram of an exemplary network station on a computer network, including an exemplary ATM adapter.

Referring to FIG. 2, a diagram of a network station 100 is shown coupled to a network 102 via a communications link 103. The network station 100 shown in FIG. 2 is an exemplary embodiment of any one of network station 12, network station 14, network station 16, or network station 18, as shown in FIG. 1. The network station 100 includes a network adapter 104 coupled to a system bus 106, a central processing unit (CPU) 108 coupled to the system bus 106, and a host memory 110 coupled to the system bus 106. For purposes of example, the network adapter 104 is an ATM network adapter, and the network 102 is an ATM network. The ATM network adapter 104 is shown having a Dynamic Random Access Memory (DRAM) device 112. The DRAM device is coupled with a Link Interface 114 and a Control Logic 116. The Link Interface 114 is coupled with the communications network 102 via the communications link 103.

As seen in FIG. 2, the DRAM device 112 may only be accessed through the adapter 104. Specifically, in the DRAM device 112 access cycle, the address is typically split into a row-address portion and a column-address portion, which are both multiplexed on the same pins. The DRAM device 112 is given the row-address portion first, and then the column-address portion, In the present invention, the DRAM devices handled have the same timing parameters but different address widths. The following table illustrates some of the DRAM devices handled by the present invention.

| Device Type | Total Addr Bits | Row Width | Column Width | DRAM Memory Size |
| --- | --- | --- | --- | --- |
| 256K × 16 | 18 | 9 | 9 | 2 Mbytes |
| 512K × 8 | 19 | 10 | 9 | 4 Mbytes |
| 1M × 16 1K refresh | 20 | 10 | 10 | 8 Mbytes |
| 1M × 16 4K refresh | 20 | 12 | 8 | 8 Mbytes |
| 2M × 8 2K refresh | 21 | 11 | 10 | 16 Mbytes |
| 2M × 8 4K refresh | 21 | 12 | 9 | 16 Mbytes |

The present invention is not limited to only work on the configurations listed in the above table. Any chip that interfaces DRAMs of different row/column width can use the present invention to detect the configuration type. In addition, the present method may be implemented in either software or hardware.

Figure 3:
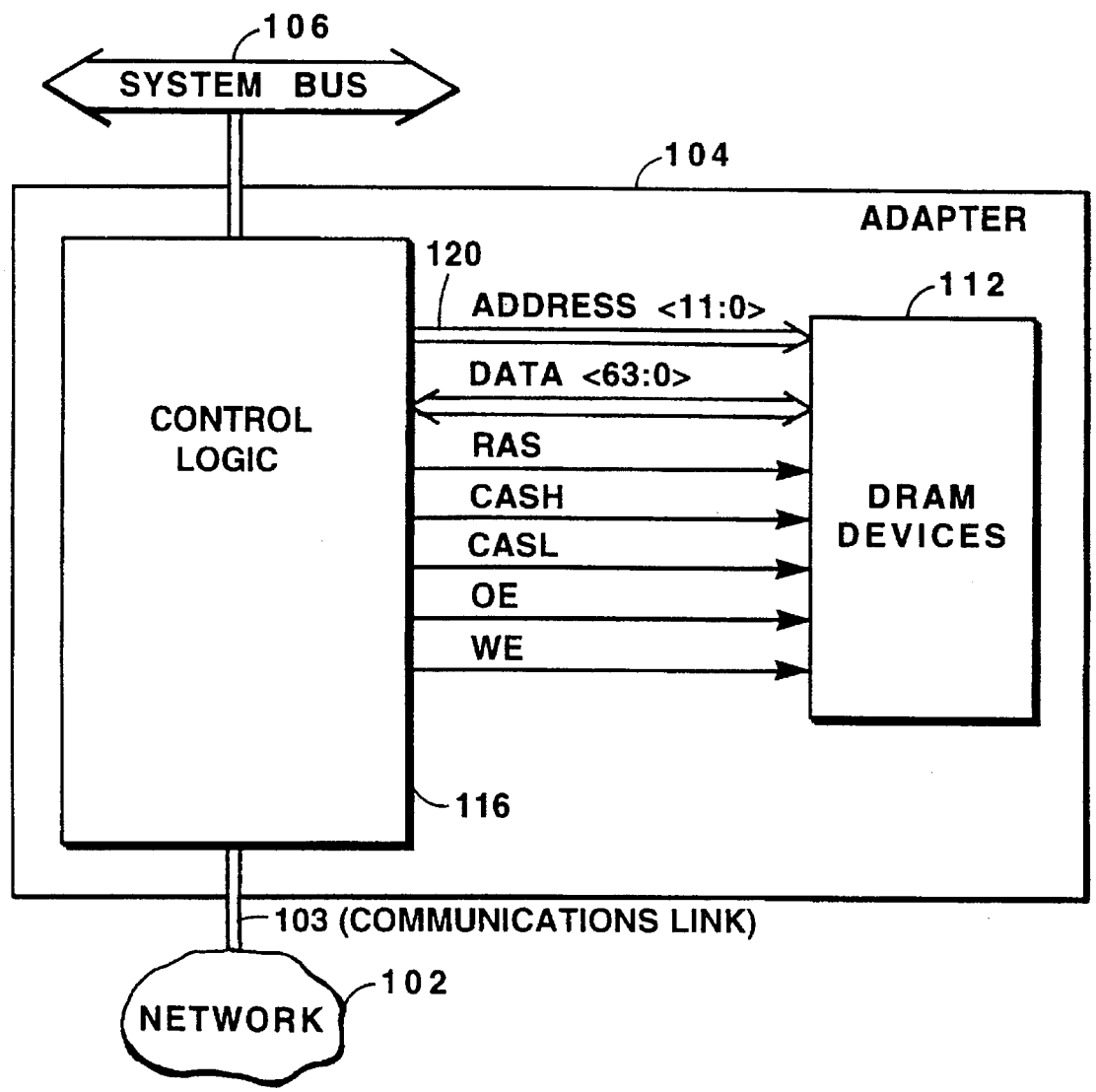
FIG. 3 is a block diagram of an exemplary interface between an adapter device and a DRAM device.

As mentioned above, in the exemplary embodiment of the present invention the DRAM 112 may only be accessed through the adapter 104. Referring to FIG. 3, an address bus 120 between the adapter 104 and the DRAM devices 112 is 12 bits wide, i.e., the maximum of each row-width and column-width shown in the above table. High order bits are left unconnected in any configuration of smaller memory size. For example, in a 4 Mbyte configuration, the row-width is 10 bits and the column-width is 9 bits. Therefore, pins of address <11:10> in FIG. 3 will be unconnected.

The adapter chip 104 does not know in what memory configuration the DRAM devices 112 is used, since designers desire to save the extra pins that would be required for giving the adapter 104 that information. The present invention gives the adapter 104 the memory configuration of the DRAM devices 112 before the adapter 104 starts interfacing with the communications link 103 to the network 102.

It should be noted that if the adapter 104 is programmed with an incorrect configuration, then some of the DRAM devices 112 locations will not have unique addresses. Still, read and write cycles will be done to the DRAM device 112 and the present invention takes advantage of this fact.

As shown in the above table, the address is split into two cycles, i.e., a rom-portion and a column portion, in any configuration. Generally, a DRAM device of a certain type will latch only the bits it needs in each of the two cycles. If the adapter 104 will perform two DRAM device 112 accesses that differ only in bits that the DRAM device 112 ignores (i.e., in the row-portion or in the column-portion), then these two accesses will be to the same physical location in the DRAM memory. For example, suppose the adapter 104 perform two write accesses, each with different data, that are actually done to the same physical locations, and two read accesses that are actually done to the same physical location. Then in both the write accesses and the read accesses the adapter 104 will get the data that was written in the second write access.

On the other hand, if the adapter 104 performs the two accesses, i.e., two reads and two writes, that differ in bits that are not ignored, then the data will be written to different DRAM memory locations. Thus, a read should get the correct data in each of the two accesses.

The present method assumes that the row-column width is twelve (12). Therefore, the present method will perform two accesses that are the same in the column portion of the access cycle, but are different in the bit ADDRESS<11> in the row portion. If the row-portion is actually smaller than 12 bits, the when the present method performs a read the same data will be obtained (of the second write cycle). If the assumption is correct, the present method will obtain the two different data values that were written. Thus, when the present method checks the read-data it knows what to expect when the width assumption is correct and when the width assumption it not correct, i.e., smaller.

Figure 4:
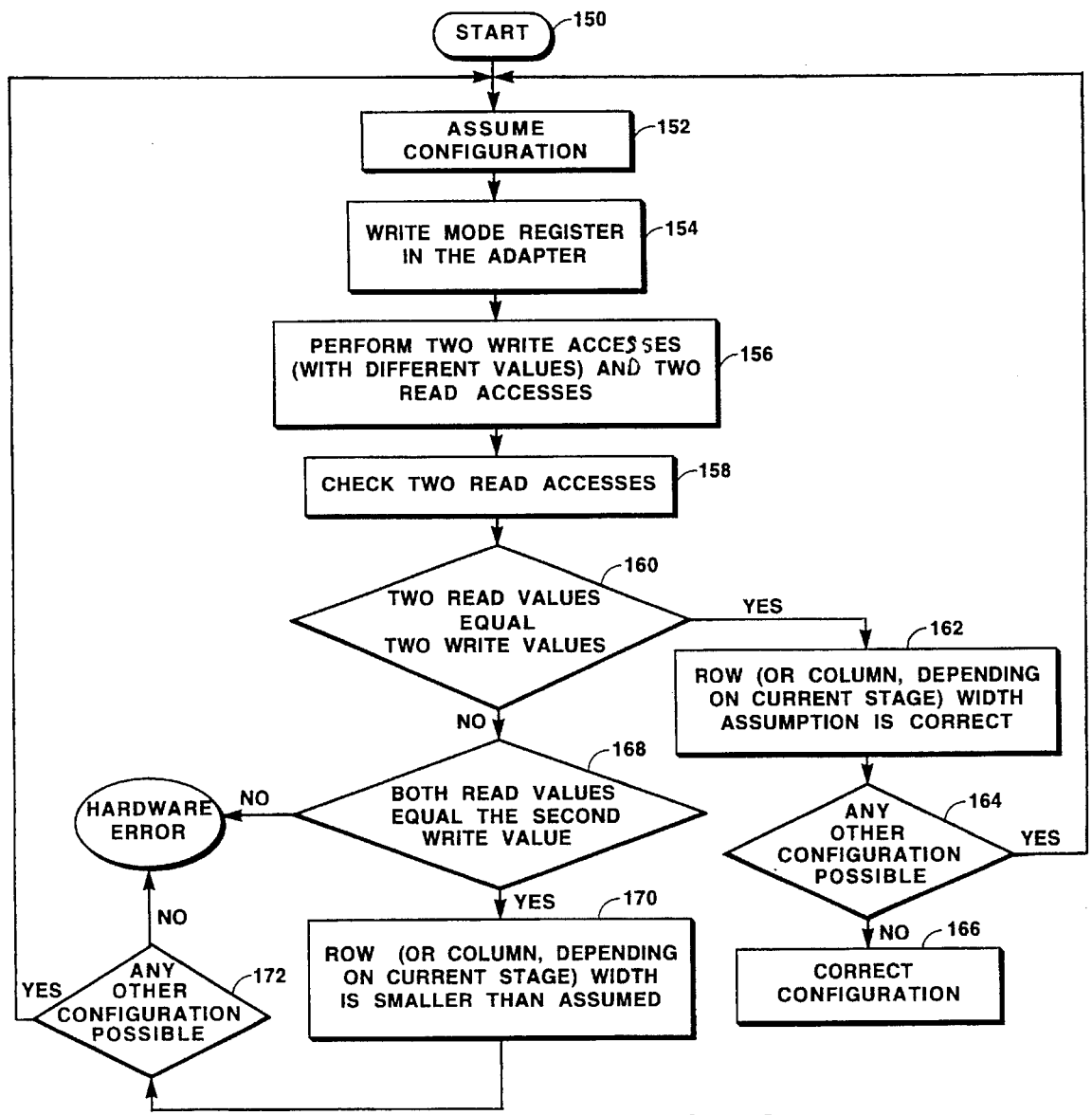
FIG. 4 is a flow chart showing a method of automatically detecting configuration type and addressing mode of the DRAM device of FIG. 3 in accordance with the present invention.

The present invention is based on elimination, first on the row portion and then on the column portion. In the above example, the present invention requires a maximum of four steps to conclude the configuration type from the six possibilities. Referring to FIG. 4, a flow chart is presented showing the present method. At step 150 the process begins. At step 152 the process assumes one of a plurality of possible configurations. At step 154, write the mode register into the adapter, which will determine how the row address will be split into a row portion and a column portion. At step

156, two write accesses with different data are performed to addresses which differ only in one bit. In the same step two read accesses are performed from these two addresses. At step 158 the two read values are checked are checked against the two write values. This step will determine if the assumed width in step 152 is correct, or whether the assumed width at step 152 is smaller. At step 160, if the read values match the write values, then the process has determined at step 162 that the assumed width is correct. At step 164, if both row and column widths are verified the correct configuration has been determined at step 166. If other possible configurations are possible, control returns to step 152 to repeat the process again. At step 168, if both read values equal the second written data, then at step 170 the width (row or column, depending on the current stage) is smaller. Thus the current assumed configuration is eliminated. At step 172, if other possible configurations are possible, control returns to step 152 to repeat the process again. If not, at step 174 a hardware error is indicated.

As mentioned previously, the present method is an elimination process. The main stages of the elimination process will now be presented in pseudo-code form as they relate to the table presented above.

```
Assume-and-check 12 bits row-width.
If read-check-ok then:
        Assume-and-check 9 bits column-width.
        If read-check-ok-then;
                Configuration is 16Mbyte 4K refresh
        Else
                Configuration is 8Mbyte 4K refresh
Else
        Assume-and-check 11 bits row-width.
        If read-check-ok then:
                Confiuration is 16Mbyte 2K refresh
        Else
                Assume-and-check 10 bits row-width.
                If read-check-ok then:
                        Assume-and-check 10 bits column-width.
                        If read-check-ok-then:
                                Configuration is 8Mbyte 1K refresh
                        Else
                                Configuration is 4Mbyte.
                Else
                        Configuration is 2Mbyte.
```

The specific implementation of the present method may be done in software or in hardware. By way of example, the present invention was implemented in software to save chip area. This exemplary implementation may be found in the DC1011 chip from Digital Equipment Corporation. The detailed implementation of the DC1011 will now be described.

Mode Register

In the exemplary embodiment found in the DC1011, each time an assumed configuration is done, a mode-register is accordingly written so that the DRAM interface logic in the adapter will generate the row portion and the column portion of the address in the DRAM cycle. The adapter's driver writes this mode register through the host bus. The driver also has interface to the chip in which it can command the chip to perform read or write data commands to it's DRAM. The driver gives the adapter the longword address to which the write/mad is required. The adapter then splits the address to the row portion and the column portion according to the mode register in the DRAM access cycle.

Addressing Modes

The maximum DRAM size is 16 Mbytes. The Driver commands the adapter to access single Longwords in the DRAM. This means that 22 bits are needed for longword address. In the present exemplary implementation the interface is 64 bit data, but the DRAM is still longword-access because two CAS lines are used. This means that the least significant bit in the longword-address is used to select between the CASH and CASL signals, and does not appear in the ADDRESS<11:0> pins.

As explained before, The division of the address between the DRAM-row portion and DRAM-Column portion is different in each configuration. The 22 bit longword-address that the driver gives the adapter in the read or write command is handled in the following way:

1. Least significant bit—is not on the DRAM address pins since the interface is a quadword-address; it effects activation of the CASH,CASL pins (so that we could write 32 bits).
2. The rest of the 21 bits are divided, according to mode register (coding the 6 possible configurations), in the DRAM-cycle between row and column address. We wire ADDRESS<11:0>, an adapter output, to each DRAM device, and leave some high-index pins unconnected when using memory configuration less than 16 Mbyte:

| Size,Refresh | Total address | | Unconnected pins |
|---|---|---|---|
| | bits | row,col | |
| 2M | 18 | 9,9 | ADDRESS<11:9> |
| 4M | 19 | 10,9 | ADDRESS<11:10> |
| 8M,1K refresh | 20 | 10,10 | ADDRESS<11:10> |
| 8M,4K refresh | 20 | 12,8 | None |
| 16M,2K refresh | 21 | 11,10 | ADDRESS<11> |
| 16M,4K refresh | 21 | 12,9 | None |

To determine the configuration the row-address width and then the column address width must be found. For example, looking at section I below, at this stage we know that the row address width is 12 bits. Two configurations have it, i.e., 16 M,4K refresh and 8 M,4K refresh. During the DRAM access cycle, the row and column address portions are multiplexed on ADDRESS<11:0> pins, so the DRAM device latches the row-address first and the column-address later. If the column width is 8 bits, then the DRAM device will ignore ADDRESS<8> in the column-part-latching (and latch only ADDRESS<7:0> as the column address). Therefore, the driver programs the adapter to act as if the column width is 9 bits, and performs Longword-writes to addresses that are different only in bit ADDRESS<8> of the column-address. If configuration is indeed 8 M 4K refresh, then we end up writing actually to the same DRAM location in both times. It is detected by reading these two addresses.

3. In any stage of the process, we know what the expected read-data should be, when the configuration assumption is right, and when it is wrong. If none of the two possibilities of the read-data is detected then we go to an ERROR-state: Either a Soft-Error-Rate occurred, or there is a defective device/wiring somewhere.

The following is the detailed implementation in the Adapter's driver, as was summarized previously.

1) 16 Mbyte 4K refresh.

2) 8 Mbyte 4K refresh.

The process now assumes 16 Mbyte 2K refresh.

---

I

Assume 12 bit row address.
- Write Mode-register assuming 16Mbyte 4K refresh,
- Write to DRAM: 1 longword, longword-address 0x3fffff, data = 0x12345678.
- Write to DRAM: 1 longword, longword-address 0x1fffff, data = 0x87654321.
    The above two write operations differ in ADDRESS<11> output in the row-address.
- Read from DRAM: 1 longword, longword-address = 0x3fffff (store into read value1)
-Read from DRAM: 1 longword, longword-address = 0x1fffff (store into read_value2)
If (read_value1 = 0x12345678) AND (read_value2 = 0x87654321) then:
    The row-address width is 12 bits. This means the DRAM Configuration is either:
        1) 16Mbyte 4K refresh.
        2) 8Mbyte 4K refresh.
    Go to next section 1A to determine between the two options
else if (read_value1 = 0x87654321) AND (read_value2 = 0x87654321) then:
    Go to section II (row part is smaller then 12 bits).
else:
    Go to ERROR

---

The assumed configuration in this stage is 16 Mbyte 4K refresh. The other possible option (8 Mbyte 4K refresh) differs in the column width. Therefore we shall test the ninth column address bit.

---

- Write to DRAM: 1 longword, longword-address = 0x2)), data = 0x1234abcd.
- Write to DRAM: 1 longword, longword-address = 0x0, data = 0xa1b2c3d4.
    The above two write operations differ in ADDRESS<8> output in the column-address.
- Read from DRAM: 1 longword, longword-address = 0x200 (store into read value1)
- Read from DRAM: 1 longword, longword-address = 0x0 (store into read value2)
If (read_value1 = 0x1234abcd) AND (read_value2 = 0xa1b2c3d4) then:
    The DRAM is 16mbyte, 4K refresh.
    Go to END
else if (read_value = 0xa1b2c3d4) AND (read_value2 = 0xa1b2c3d4) then:
    The DRAM is 8Mbyte, 4K refresh.
    Write Mode-register accordingly.
    Go to END
else:
    GO TO ERROR

---

Assume 11 bit row address. Until this stage, the process has already ruled out:

---

- Write Mode-register assuming 16mbyte 2K refresh.
- Write to DRAM: 1 longword, longword-address = 0x3fffff, data = 0x12341234.
- Write to DRAM: 1 longword, longword-address = 0x1fffff, data = 0x87658765.
    The above two write operations differ in ADDRESS<10> output in the row-address.
- Read from DRAM: 1 longword, longword-address = 0x3fffff (store into read

```
value1)
- Read from DRAM: 1 longword, longword-address = 0x1fffff. (store into
read_value2)
If (read_value1 = 0x12341234) AND (read_value2 = 0x87658765) then:
       The DRAM is 16mbyte, 2K refresh.
       Go to END
else If (read_value1 = 0x87658765) AND (read_value2 = 0x87658765) then:
       Row address width is smaller then 11 bits.
       Go to section 3.
else:
       Goto ERROR.
```

Assume 10 bit row address. Until this stage the process has ruled out:

1) 16 Mbyte 4K refresh.

2) 16 Mbyte 2K refresh.

3) 8 Mbyte 4K refresh.

There are two configurations with 10 bit row-addresses:

1) 4 Mbyte 2) 8 Mbyte 1K refresh

The process assumes 8 Mbyte 1K refresh.

2) 8 Mbyte 1K refresh

Both options differ in the column address width.

The current Mode-register value is of 8 Mbyte 1K refresh.

(10 bits column width)

```
- Write Mode-register assuming 8Mbyte 1K refresh.
- Write to DRAM: 1 longword, longword-address = 0x1fffff, data =
0x10203040.
- Write to DRAM: 1 longword, longword-address = 0xffff, data =
0x80706050.
       The above two write operations differ in ADDRESS<9> output in the row-
address.
- Read from DRAM: 1 longword, longword-address = 0x1ffff (store into read
value1)
- Read from DRAM: 1 longword, longword-address = 0xffff (store into read
value2)
If (read_value1 = 0x10203040) AND (read_value2 = 0x80706050) then:
       Row address width is 10. We have here two options:
              1) 4Mbyte
              2) 8Mbyte 1K refresh
              Goto section IIIA to determine between them.
else If (read_value1 = 0x80706050) AND (read_value2 = 0x80706050)
then:
       Row address width is smaller than 10, therefore the actual configuration
       is 2Mbytes.
       Write Mode-register accordingly.
       Go to END
else:
       Goto ERROR.
```

Row address width is 10. There are two options:

1) 4 Mbyte

```
- Write to DRAM: 1 longword, longword-address = 0x400, data = 0x34563456.
- Write to DRAM: 1 longword, longword-address = 0x0, data = 0x12481248.
       The above two write operations differ in ADDRESS<9> output in the
column-address.
- Read from DRAM: 1 longword, longword-address = 0x400 (store into
read_value1)
- Read from DRAM: 1 longword, longword-address = 0x0. (store into
read_value2)
If (read_value1 = 0x34563456) AND (read_value2 = 0x1238f248) then:
       Configuration is 8mbyte 1K refresh
       Go to END
else if (read_value1 = 0x12481248) AND (read_value2 = 0x12481248) then:
       Configuration is 4Mbyte.
       Write Mode-register accordingly.
       Go to END
else:
       Goto ERROR.
```

At this point the Mode-register value has been determined and written to the adapter. The adapter now "knows" how to address the DRAM.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method for determining a configuration type of a plurality of dynamic random access memory (DRAM) devices comprising the steps of:

providing an adapter, the adapter having an adapter memory;

providing a first DRAM device, the first DRAM device having an actual DRAM configuration;

providing an interface for communicating between the first DRAM device and the adapter; and determining, in the adapter memory, the DRAM configuration, the step of determining comprising the steps of:

assuming a first DRAM configuration of one of a plurality of DRAM configurations for the first DRAM device;

determining whether the first DRAM configuration matches the actual DRAM configuration, said step of determining comprising the substeps of loading the first DRAM configuration into a mode register in the adapter;

performing a first write access, a second write access, a first read access, and a second read access;

comparing the first write access and the second write access to the first read access and the second read access;

assuming a second DRAM configuration if the first write access and the second write access equal the first read access and the second read access; and assuming a third DRAM configuration if the first read access and the second read access equals the second write access; and repeating the steps of assuming and determining if the first DRAM configuration does not equal the actual DRAM configuration.

2. The method for determining a configuration type of a plurality of dynamic random access memory (DRAM) devices according to claim 1 wherein the step of assuming a third DRAM configuration assumes the actual DRAM configuration is of a smaller address width.

3. A method for determining a configuration type in an Asynchronous Transfer Mode (ATM) communications network comprising the steps of:

providing an ATM adapter, the ATM adapter having an ATM adapter memory;

providing a DRAM device, the DRAM device having an actual DRAM configuration;

providing a link to connect the ATM adapter and the DRAM device;

assuming, in the ATM adapter memory, a first DRAM configuration;

verifying the step of assuming; and repeating the steps of assuming and verifying until the actual DRAM configuration is determined, the step of verifying comprising the step of eliminating any one of a plurality of DRAM configurations that does not equal the actual DRAM configuration, the step of eliminating further comprising the substeps of:

loading the first DRAM configuration into a mode register in the adapter;

performing a first write access, a second write access, a first read access, and a second read access;

comparing the first write access and the second write access to the first read access and the second read access;

assuming a second DRAM configuration if the first write access and the second write access equal the first read access and the second read access; and assuming a third DRAM configuration if the first read access and the second read access equal the second write access.

4. The method for determining a configuration type in an ATM communications network according to claim 3 wherein the step of assuming a third DRAM configuration assumes the actual DRAM configuration is of a smaller address width.

* * * * *